Feb. 2, 1960

N. O. WHITE 2,923,375

FILTER

Filed April 29, 1957

INVENTOR.
NORMAN O. WHITE
BY
ATTORNEY

Feb. 2, 1960 N. O. WHITE 2,923,375
FILTER
Filed April 29, 1957 3 Sheets-Sheet 2

INVENTOR.
NORMAN O. WHITE
BY
ATTORNEY

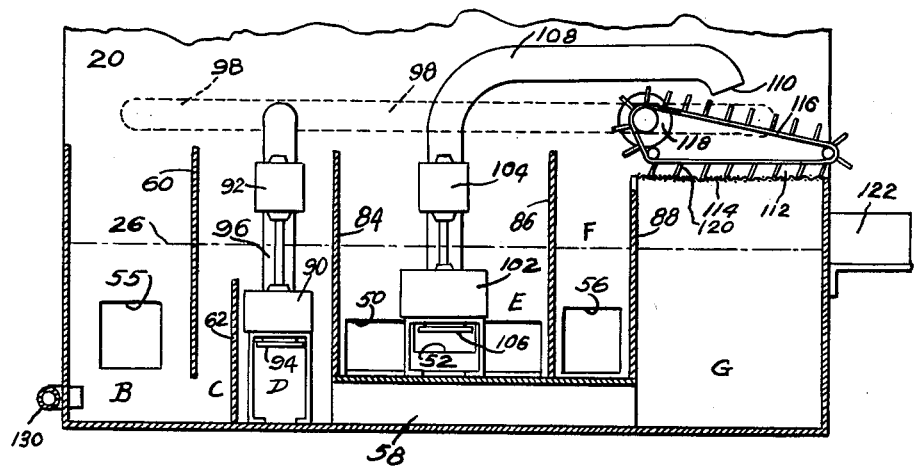

United States Patent Office 2,923,375
Patented Feb. 2, 1960

2,923,375

FILTER

Norman O. White, Farmington, Mich.

Application April 29, 1957, Serial No. 655,798

11 Claims. (Cl. 183—3)

The present invention relates to a filtering device, and system for removing dirt and foreign material from the air, and more particular to an industrial filter wherein a circulation of air is washed by a liquid fall, such as water, and the liquid filtered by improved means to permit a recirculation of the liquid used for the water fall.

It is an object of the present invention to provide an apparatus having air and liquid chambers through which air passes in a tortuous stream through air chambers and liquid is conducted through the air chambers in a direction opposite to the flow of liquid.

Other objects of the invention are to draw the dirty air through a liquid, discharge the dirty liquid into a liquid chamber, pump the dirty liquid to a filter screening device, conducting the screened liquid to a clean liquid chamber, and pump the clean liquid back to the dirty air stream.

A further object of the invention is to provide a differential in the amount of liquid supplied to the screening device and the amount supplied to the air flow chamber.

Another object of the invention is to maintain a predetermined liquid level in a plurality of chambers by a liquid supply valve controlled by the liquid level in one of the chambers which valve conducts the liquid supply to one of the other chambers.

Other objects and advantages of the invention will be more fully understood from the following description taken in connection with the accompanying drawings in which:

Fig. 3 is a cross sectional view through the liquid chambers, taken on line 3—3 of Fig. 2.

Figure 1:
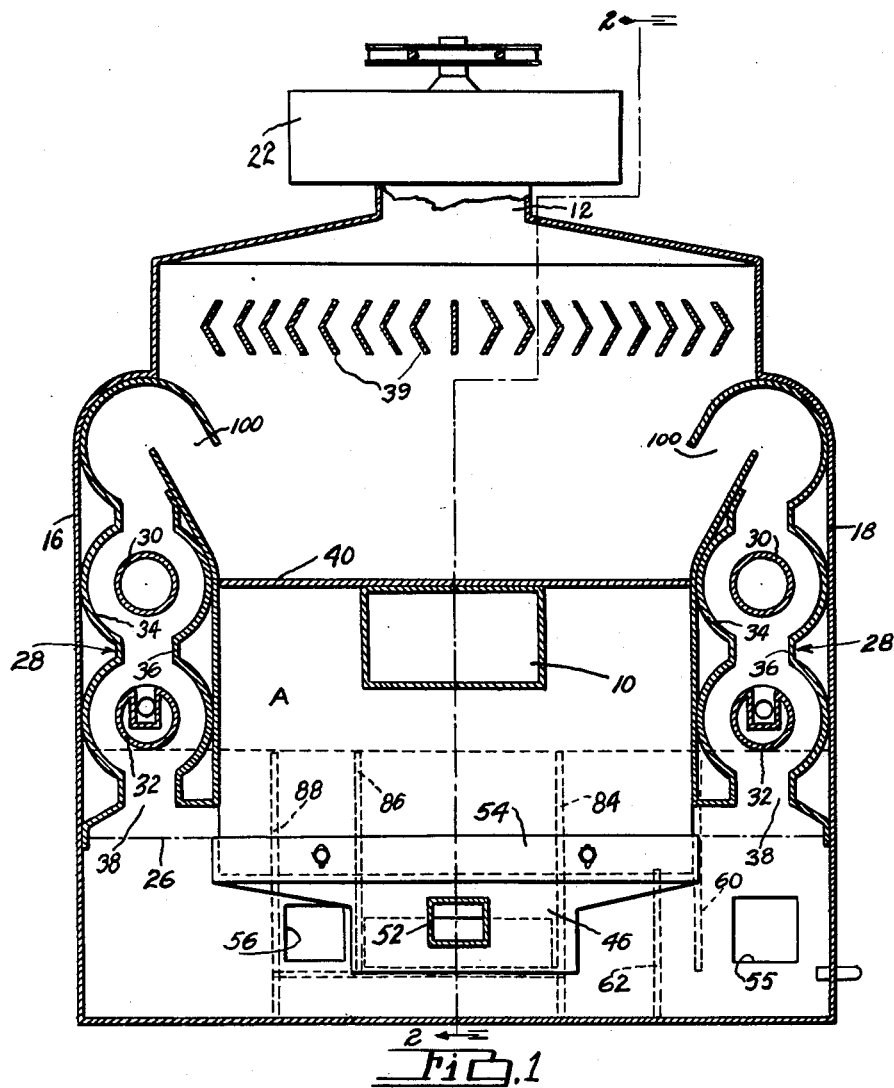
Fig. 1 is a cross sectional view of the improved filter taken on line 1—1 of Fig. 2, showing the air stream chambers.
Figure 2:
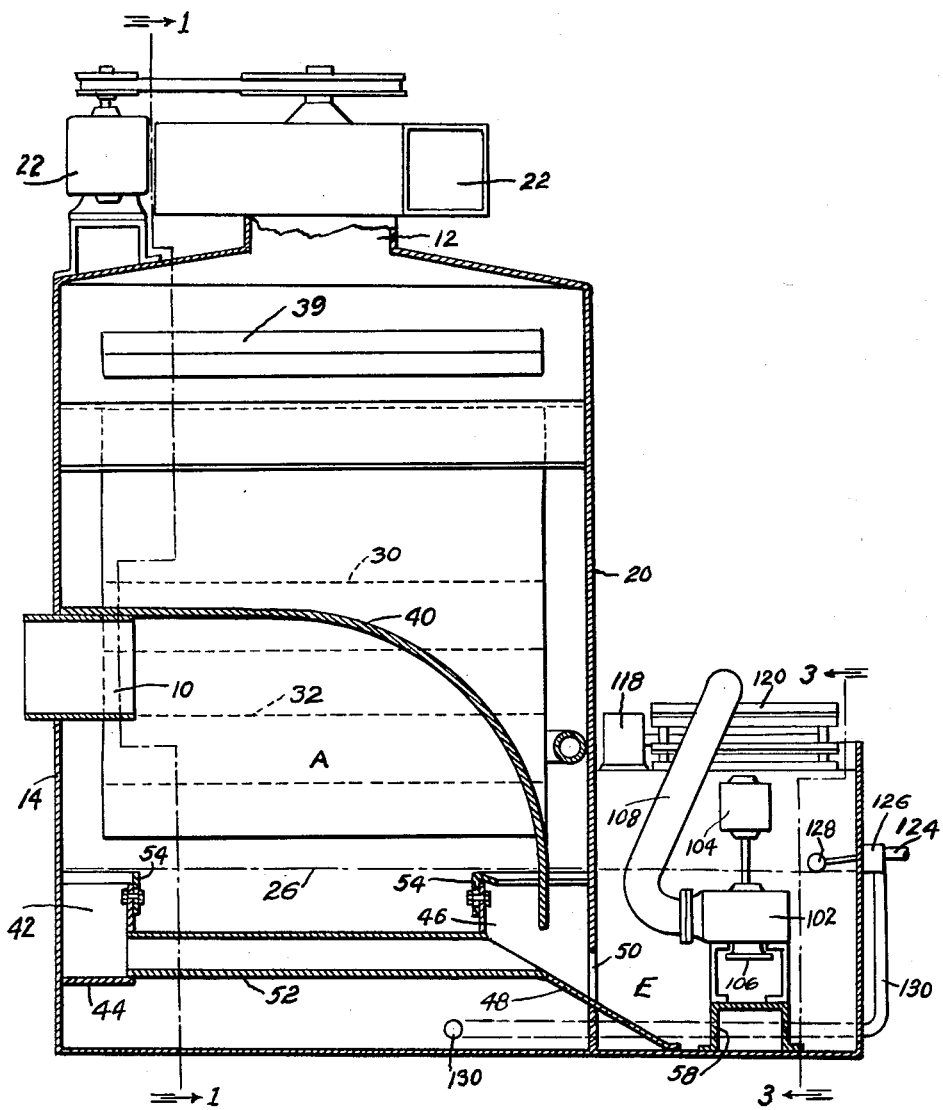
Fig. 2 is a cross sectional view taken on line 2—2 of Fig. 1, showing the air stream chamber and one of the liquid chambers.

Referring to the drawings, I have shown the improved filter comprising a main chamber A, having an air inlet opening 10, an exhaust opening 12, and a plurality of liquid chambers B, C, D, E, F and G adjacent to and some of which communicate with a liquid compartment in the chamber A. The chamber A, except for the openings 10 and 12 and other liquid conducting openings, later described, is a closed receptacle having a front wall 14, side walls 16, and walls 18, and a back wall 20. A blower 22, driven by a motor 24, is provided at the upper end of the chamber A adapted to draw air through the chamber. The lower end of the chamber A contains a supply of liquid, the liquid level being indicated by the line 26.

At each of the opposite sides of the chamber A is a combined liquid and air circulating unit 28. This unit has its lower end extending above the liquid level 26 and extending upwardly into the upper portion of the chamber A. The unit comprises transversely extending tubes 30 and 32 which are spaced apart, and irregularly shaped plates 34 and 36 spaced from the tubes and conforming generally to the shape of the outer periphery of the tubes, but spaced apart so as to provide an opening there between, forming a liquid and air passage 38 from the top of the liquid level 26 to the region of the upper wall where the exhaust opening 12 is located. Baffle plates 39 are provided in the upper portion of chamber A to intercept any liquid carried over by the air stream and return the liquid to the upper surface of the partition 40.

Above the air inlet 10 is a transversely extending partition 40 which is curved downwardly and rearwardly toward the back wall 20, but terminates in spaced relation therefrom and below the liquid level 26. The partition extends between the air and liquid circulating units 28 so that the incoming air is divided, partly passing through each unit to the upper portion of the chamber A.

A front trough 42, secured to the front wall 14, is provided with an open top at the liquid level 26 and a bottom wall 44 spaced above the bottom of the chamber A. A back trough 46, secured to the back wall 20, has its open top surface above and surrounding the lower free edge of the partition 40 and slightly below the liquid level. The bottom wall 48 is sloped toward the back wall 20 and downwardly, there being an opening 50 through the back wall 20 into a back chamber E. A tube 52 connects the front trough 42 with the back trough 46. Vertically adjustable plates 54 are provided on the upper edges of the troughs 42 and 46 for regulating the liquid level in each trough.

The chambers B, C, D, E, F and G are located behind the back wall 20 and serve as liquid chambers. The back wall 20 is provided with an opening 55, forming a communication from the chamber A to the chamber B, and an opening 56, forming a communication from the chamber A to the chamber F. These are in addition to the opening 50 to the chamber E. There is a tube 58 forming a communication from the chamber D to the chamber G.

The chambers B and C are divided by a baffle plate 60 which is spaced from the bottom wall of chambers B and C and chambers C and D are divided by a baffle plate 62, the upper edge of which terminates below the liquid level 26. The wall 84 divides the chambers D and E, a wall 86 divides the chambers E and F, and a wall 88 divides the chambers F and G. The chamber G will be referred to as the clean liquid chamber; the chamber F as the overflow chamber; the chamber E as the dirty liquid chamber; the chamber D as another clean liquid chamber; and the chambers B and C as partially clean liquid chambers, depending upon which way the liquid is flowing to the chamber C, through opening 55 from chamber A or through opening 55 from chamber B to chamber A, hereinafter more fully described.

A fluid pump 90, driven by motor 92, is located in chamber D with its intake 94 located about midway between the liquid level 26 and the bottom of the chamber, and its outlet connected to a conduit 96, branched in two directions, as at 98, to one of the tubes 30 and 32, here shown as 32, of the air and liquid circulating units 28. The tube 32 is in the nature of a trough, being slotted longitudinally to permit the liquid to spill over the outer periphery of the tube. The air stream has sufficient velocity to cause a portion of the spilled over liquid to be lifted to the upper tube 30 and there beyond producing a thin liquid film on the tube and irregularly shaped plates 34 and 36. A partial amount of the liquid is carried by the air current into the upper portion of the chamber A, above the partition 40. The plates 34 and 36 form a curved passage at the top of the units 28, having discharge openings 100 directed inwardly and downwardly toward the partition 40, whereby the liquid is centrifugally thrown onto the partition 40 where it is drained over the curvature to the back trough 46 as a film of dust laden liquid into the chamber E, through opening 50 in the back wall 20. The incoming air, through inlet opening 10, is directed downwardly by the curved portion 40 and forwardly across the liquid surface of the liquid surface of the liquid level 26. This surface collects the heavier particles of dirt which are forced by the forward air stream into the front trough 42; there being a surface flow of the liquid toward the front trough 42 caused by the air flow. The dirty liquid in the trough 42 is directed through tube 52 into the bottom of back trough 46 where it is directed through opening 50 in the chamber E.

Another fluid pump 102, driven by motor 104, is located in the chamber E with its intake 106 located between the liquid level 26 and the bottom of the chamber E, and its outlet connected to a conduit 108 which has a discharge end 110 over a fluid filter screen unit 112 located at the top of chamber G. This filter unit 112 removes the dirt which has been collected through the air and liquid circulating units 28 and delivered to the chamber E. The clean liquid in chamber G is delivered to chamber D through tube 58 where it in recirculated by the fluid pump 90 to the units 28. The filter may be of any well known type but is here illustrated as a fine mesh screen 114 located slightly below the upper edge of the plate 88. The dirt collected by the screen is removed by a conveyor comprising an endless belt 116 driven by a motor 118. Blades, or wipers, 120 carried by the belt 116 move over the upper surface of the screen 114, uncover it and deposit the dirt in a receptacle 122.

Should the screen 114 become clogged or the filter unit 112 fail in its operation, the liquid discharged from the conduit 108 flows into the overflow chamber F and is returned to the chamber A through opening 56 in the back wall 20.

There is a differential in volume of liquid pumped by the two pumps 90 and 102 to assure an ample supply of clean liquid. Let it be assumed that the pump 90 delivers one hundred and twenty gallons per minute and the pump 102 delivers one hundred and sixty gallons per minute, there is a difference of forty gallons per minute flowing through tube 58 from chamber G to chamber D. There will be a flow of clean liquid from chamber D, over baffle plate 62 to chamber C, beneath baffle plate 60 to chamber B and through opening 55 to chamber A. Should the pump 102 fail in its operation, the pump 90 receives its supply of liquid from chamber A, reversing the flow of liquid through opening 55 and chamber C to chamber D. Thus it will be seen that the liquid may flow in either direction through the opening 55 from chamber A to chamber D or from chamber D to chamber A. The most of the dirty liquid is confined to troughs 42, 46 and chamber E. It is to be noted that the chamber E receives its liquid supply only through the back trough 46 and opening 50.

A supply of liquid for maintaining the liquid level at the desired height is regulated by the liquid level in the chamber E in which the pump 102 is located. A liquid inlet pipe 124 is connected to a valve 126 which is controlled by a liquid level float 128. When the liquid level is lowered, due to waste, evaporation, etc., the valve is opened causing the liquid to flow through pipe 130 to the chamber A. The chamber A is subjected to subatmospheric pressure when the blower 22 is operating, producing a slightly higher liquid level in the chamber A than in the chamber E. The only supply of liquid to chamber E is through the opening 50 from front trough 42 and back trough 46. It is therefore desirable to maintain a flow of liquid over the top of adjustable plates 54, otherwise the liquid level in chamber E will fall below the intake opening to pump 102, resulting in a failure of liquid supplied through conduit 108 which, in addition to the supply through pipe 130, supplies liquid to chamber A. Since the variations of liquid level in chamber A, from a flow over the plates 54 to a no flow are very slight, and the variations of liquid level in chamber E to the pump intake level are comparatively larger, it is desirable to regulate the input of liquid to chamber A from the liquid level in chamber E.

While the invention has been illustrated and described in specific detail, it will be understood that various changes including the size, shape and arrangement of parts may be made without departing from the spirit of my invention, and it is intended that all matter contained in the above description and shown in the accompanying drawings shall be interpreted as illustrative and not in a limiting sense to restrict the terms of the appended claims.

I claim:

1. A filter comprising, a main chamber having a liquid compartment in its lower portion and an air circulating compartment above the liquid level in said liquid compartment, an air inlet in said chamber above the liquid level, a blower at one end of said chamber for drawing air through said chamber, a combined liquid and air circulating unit at the opposite sides of said air inlet, said units being open at their opposite ends, means for supplying a liquid to each of said units, and a curved baffle plate above said air inlet extending between said units and terminating below the liquid level and in spaced relation to the back wall of said main chamber, the inlet openings of said units being located below said curved baffle for receiving air from said air circulating compartment and the discharge opening being above and directed to the upper surface of said curved baffle.

2. A filter comprising, a main chamber having a liquid compartment in its lower portion and an air circulating compartment above the liquid level in said liquid compartment, an air inlet in said chamber above the liquid level, a blower at one end of said chamber for drawing air through said chamber, a combined liquid and air circulating unit in said air circulating compartment, said unit being open at its opposite ends, means for supplying a liquid to said unit, a baffle plate for directing the air stream through said unit, located above said air inlet, terminating below the liquid level and in spaced relation to the back wall of said main chamber, the discharge outlet of said unit being directed toward the upper surface of said baffle plate, a back trough surrounding the submerged lower edge of said baffle plate which extends below the liquid level in said chamber, a second chamber for receiving the liquid in said trough, a filter screen, a pump for forcing the liquid from said second chamber to said filter screen, and a pump for returning the screened liquid to said unit.

3. A liquid filtering and screening device for an air filter wherein liquid is used to collect the dirt from the air comprising, a main chamber having an air circulation compartment in its upper portion and a liquid compartment in its lower portion, means for supplying a liquid fall in said air chamber, an air inlet in said air chamber, a baffle plate above said air inlet for directing the air over the liquid level in said liquid compartment, said baffle plate terminating below the liquid level and in spaced relation to the back wall of said main chamber, the air discharge outlet of said air circulating compartment being directed toward the upper surface of said baffle plate, a back trough surrounding the submerged lower edge of said baffle plate which extends below the liquid level in said chamber, a front trough having a passage forming a communication to said back trough, a second chamber for receiving the liquid from said back trough, a filter screen, a pump for forcing the liquid from said second chamber to said filter screen, and a pump for returning the screened liquid to said air circulating compartment.

4. A liquid filtering and screening device for an air filter wherein liquid is used to collect the dirt from the air comprising, a main chamber having an air circulation compartment in its upper portion and a liquid compartment in its lower portion, means for supplying a liquid fall in said air chamber, an air inlet in said air chamber, a blower for producing an air stream through said air chamber, a trough having a liquid inlet opening at the liquid level of the liquid in said liquid compartment, a second chamber for receiving the liquid from said trough, a filter screen, a pump for forcing the liquid from said second chamber through said filter screen, a pump for returning the screened liquid to said air circulating compartment, and means for vertically adjusting the inlet opening of said trough, whereby it may be varied in relation to the liquid level of said liquid compartment.

5. A filter comprising, a main chamber having a liquid compartment in its lower portion and an air circulating compartment above the liquid level in said liquid compartment, an air inlet in said chamber above the liquid level, units open to the air stream at their opposite ends and located at the opposite sides of said air inlet for producing a turbulence to the air stream through said units, means for supplying liquid to said units, a baffle plate above said air inlet extending between said units and terminating below the liquid level and in spaced relation to the back wall of said chamber for directing the air stream through said units, by its under surface, and receiving on its upper surface the liquid discharged from said units, a second chamber for receiving the liquid from the upper surface of said baffle plate, means for filtering the liquid from said second chamber, and means for returning the filtered liquid to said units.

6. In a filter for cleaning air comprising, a first chamber having a liquid compartment in its lower portion and a combined air and liquid circulating system in its upper portion, means for drawing air through the upper portion of said chamber, means for supplying liquid to the upper portion of said chamber, a second chamber for receiving liquid from said first chamber, a third chamber, a liquid filter unit associated with said third chamber, pump means for supplying liquid from said second chamber to said filter unit and therethrough to said third chamber, an overflow chamber for said third chamber communicating with said first liquid chamber, a fourth chamber having a liquid passage communicating with said third chamber, pump means for supplying liquid from said fourth chamber to the upper portion of said first chamber, and a liquid passage between said fourth chamber and said first chamber.

7. A liquid circulating system for an air filtering device comprising, a main chamber having a liquid compartment in its lower portion, a second liquid chamber having a liquid passage leading to said main chamber adjacent the region of the liquid level in said main chamber, a third liquid chamber, a liquid filter screen adjacent the upper portion of said third chamber, a pump for conducting liquid from said second chamber through said filter screen and into said third chamber, a second pump for conducting liquid from said third chamber to said main chamber and discharging the liquid into said main chamber above the liquid level in said main chamber, and a second passage leading from said third chamber to the liquid compartment of said main chamber, said passage being located adjacent the bottom of said main chamber and said third chamber.

8. A liquid circulating system for an air filtering device comprising, a main chamber having a liquid compartment in its lower portion, a second liquid chamber having a liquid passage leading to said main chamber, a third liquid chamber, a liquid filter screen adjacent the upper portion of said third chamber, an overflow chamber for receiving liquid which does not pass through said filter screen, a passage from said overflow passage leading from said overflow chamber to said main chamber, a pump for conducting liquid from said second chamber through said filter screen and into said third chamber, a second pump for conducting liquid from said third chamber to said main chamber and discharging the liquid into said main chamber above the liquid level in said main chamber, and a second passage leading from said third chamber to the liquid compartment of said main chamber, said passage being located adjacent the bottom of said main chamber and said third chamber.

9. A liquid circulating system for an air filtering device comprising, a main chamber having a liquid compartment in its lower portion, a second liquid chamber having a liquid passage leading to said main chamber adjacent the region of the liquid level in said main chamber, a third liquid chamber, a liquid filter screen adjacent the upper portion of said third chamber, a pump for conducting liquid from said second chamber through said filter screen and into said third chamber, a second pump for conducting liquid from said third chamber to said main chamber and discharging the liquid into said main chamber above the liquid level in said main chamber, and a second passage leading from said third chamber to the liquid compartment of said main chamber, said passage being located adjacent the bottom of said main chamber and said third chamber, said second pump being located between the discharge opening of said second passage into said main chamber and the opening of said passage to said third chamber.

10. A filter comprising, a chamber open at its opposite ends, a blower at one end of said chamber for producing an air stream upwardly through said chamber, a liquid supply member within said chamber for supplying liquid to said chamber, the gravity fall of the liquid being intercepted by the air stream, another member in said chamber for intercepting the liquid and air stream, plates conforming generally to the outer shape of said members spaced apart and spaced from the outer surfaces of said members for directing the air stream in said chamber in a tortuous path around said members, and a downwardly directed plate at the upper outlet opening end of said chamber for centrifugally throwing the liquid and air stream outwardly and downwardly from said chamber.

11. A filter comprising, a chamber open at its opposite ends, a blower at one end of said chamber for producing an air stream upwardly through said chamber, a liquid supply member within said chamber for supplying liquid to said chamber, the liquid having a gravity fall downwardly through said chamber and the gravity fall of the liquid being intercepted by the air stream, another member in said chamber for intercepting the liquid and air stream, plates conforming generally to the outer shape of said members spaced apart and spaced from the outer surfaces of said members for directing the air stream in said chamber in a tortuous path around said members, a downwardly directed plate at the outlet opening end of said chamber for centrifugally throwing the liquid and air stream outwardly and downwardly from said chamber, and a downwardly directed baffle plate adjacent the outlet opening of said chamber for receiving the liquid and air stream as it is discharged from said chamber.

References Cited in the file of this patent
UNITED STATES PATENTS

| | | |
|---|---|---|
| 99,864 | Ebert | Feb. 15, 1870 |
| 604,844 | Roberts | May 31, 1898 |
| 943,422 | Knoepfel | Dec. 14, 1909 |
| 1,487,743 | Hodge | Mar. 25, 1924 |
| 2,031,437 | Vincent | Feb. 18, 1936 |
| 2,337,983 | Fisher | Dec. 28, 1943 |
| 2,494,602 | Wright | Jan. 17, 1950 |
| 2,539,344 | Carraway | Jan. 23, 1951 |
| 2,546,259 | Fenn | Mar. 27, 1951 |
| 2,560,635 | Conyers | July 17, 1951 |
| 2,775,310 | Shelton | Dec. 25, 1956 |
| 2,793,709 | White | May 28, 1957 |